(12) United States Patent
Spjuth et al.

(10) Patent No.: US 9,472,800 B2
(45) Date of Patent: Oct. 18, 2016

(54) CONTACT ARRANGEMENT FOR SAFE DISCONNECTION OF A POWER SUPPLY IN A VEHICLE

(71) Applicant: VOLVO CAR CORPORATION, Gothenburg (SE)

(72) Inventors: Orjan Spjuth, Lindome (SE); Patrik Larsson, Torslanda (SE)

(73) Assignee: Volvo Car Corporation, Gothenburg (SE)

( * ) Notice: Subject to any disclaimer, the term of this patent is extended or adjusted under 35 U.S.C. 154(b) by 462 days.

(21) Appl. No.: 13/939,756

(22) Filed: Jul. 11, 2013

(65) Prior Publication Data
US 2014/0015311 A1  Jan. 16, 2014

(30) Foreign Application Priority Data

Jul. 12, 2012  (EP) ..................... 12176170

(51) Int. Cl.
| | |
|---|---|
| *H01M 2/34* | (2006.01) |
| *B60R 16/02* | (2006.01) |
| *H02J 7/00* | (2006.01) |
| *B60L 3/00* | (2006.01) |
| *B60L 3/04* | (2006.01) |

(52) U.S. Cl.
CPC .............. *H01M 2/34* (2013.01); *B60L 3/0007* (2013.01); *B60L 3/04* (2013.01); *B60R 16/02* (2013.01); *H02J 7/0031* (2013.01)

(58) Field of Classification Search
CPC ...... B60L 3/0007; B60L 3/04; H02J 7/0031; B60K 2028/006; B60K 28/14; B60R 16/03
USPC .................... 307/10.1, 121, 10.7; 180/279
See application file for complete search history.

(56) References Cited

U.S. PATENT DOCUMENTS

| | | | | |
|---|---|---|---|---|
| 3,743,849 | A * | 7/1973 | Iwata ..................... | B60K 28/14 180/279 |
| 3,882,957 | A * | 5/1975 | Fritz ..................... | B60K 28/14 180/284 |
| 5,757,150 | A * | 5/1998 | Kinoshita ............. | B60L 3/0007 200/61.08 |
| 6,239,515 | B1 * | 5/2001 | Mackel ................ | H02H 11/002 180/279 |
| 6,333,568 | B1 | 12/2001 | Bitsche et al. | |
| 6,417,579 | B1 * | 7/2002 | Lehnst ................... | B60K 28/14 180/282 |

(Continued)

FOREIGN PATENT DOCUMENTS

| | | |
|---|---|---|
| EP | 0980793 | 2/2000 |
| FR | 2896087 | 7/2007 |
| WO | 2012027836 | 3/2012 |

OTHER PUBLICATIONS

Extended European Search Report for EP 12176170.4, Completed by the European Patent Office on Dec. 20, 2012, 4 Pages.

*Primary Examiner* — Ruth Ilan
(74) *Attorney, Agent, or Firm* — Brooks Kushman P.C.

(57) ABSTRACT

A contact arrangement is described for connecting a power supply to electrical components in a vehicle. The contact arrangement may include a first mechanical contact for connecting a first lead of the power supply to an electrical component, and a second mechanical contact for connecting a second lead of a power supply to the electrical component. The first and second mechanical contacts are configured to disconnect the power supply in the event of a collision. The first mechanical contact is configured to be arranged substantially perpendicular to the second mechanical contact in relation to a transverse plane of the vehicle.

20 Claims, 1 Drawing Sheet

(56) References Cited

U.S. PATENT DOCUMENTS

| | | | |
|---|---|---|---|
| 7,011,176 B2 * | 3/2006 | Yugo | B60L 3/0015 180/274 |
| 2007/0026711 A1 * | 2/2007 | Chorian | B60K 28/14 439/174 |
| 2007/0152432 A1 * | 7/2007 | Uchida | B60K 28/14 280/735 |
| 2008/0036419 A1 * | 2/2008 | Cook | H02J 7/0031 320/104 |
| 2008/0197810 A1 * | 8/2008 | Ishikawa | B60L 3/0007 320/135 |
| 2009/0212627 A1 * | 8/2009 | Sakata | H02H 9/001 307/10.7 |
| 2012/0013178 A1 * | 1/2012 | Lim | H02J 7/0031 307/9.1 |
| 2012/0058382 A1 | 3/2012 | Carignan et al. | |

* cited by examiner

CONTACT ARRANGEMENT FOR SAFE DISCONNECTION OF A POWER SUPPLY IN A VEHICLE

CROSS-REFERENCE TO RELATED APPLICATIONS

This application claims priority to European Patent Application No. 12176170.4 filed Jul. 12, 2012, the disclosure of which is incorporated in its entirety by reference herein.

TECHNICAL FIELD

The present disclosure relates to a contact arrangement. More particularly, the present disclosure relates to a contact arrangement for safe disconnection of a power supply in a vehicle.

BACKGROUND

Hybrid and electrical vehicles typically comprise a high voltage power supply in the form of one or more batteries for providing power to one or more electrical motors and/or other components.

When servicing or performing repairs on such a vehicle it is important that power is disconnected from electrical components and wiring in the vehicle to reduce the risk of an operator being exposed to potentially dangerous a high voltage.

In particular, in the event of a collision, it is important that the power supply is disconnected from electrical components in the vehicle so that passengers and rescue workers are not exposed to a high voltage.

Furthermore, it should be avoided that current is supplied to any wires or components that may have been damaged in the collision.

A suggested approach for ensuring disconnection of the power supply in the event of a collision is presented in WO2012/027836 where it is proposed to arrange an interrupter for disconnecting one or more batteries in an electric or hybrid vehicle in the event of a collision. The interrupter includes a pyrotechnic charge and a mechanical cutter for cutting a mechanical element, thereby disconnecting the battery.

A drawback of the abovementioned suggested solution is that after a collision event, the entire safety device must be replaced as the explosive device is triggered and electrical connections are physically severed. As a collision event may result in only limited damage or no damage at all to the vehicle, it would be preferable to be able to reconnect the power supply without replacing the entire safety device.

Furthermore, the use of an explosive device close to a high voltage power supply may potentially risk damaging the power supply when the explosion is triggered.

SUMMARY

In view of the above-mentioned and other drawbacks of the prior art, a general object of the present disclosure is to provide an improved contact arrangement for safe disconnection of a power supply in a vehicle in the event of a collision.

According to a first aspect of the present disclosure, it is therefore provided a contact arrangement for connecting a power supply to electrical components in a vehicle, the contact arrangement comprising: a first mechanical contact for connecting a first lead of the power supply to an electrical component; and a second mechanical contact for connecting a second lead of a power supply to the electrical component; the first and second mechanical contacts being configured to disconnect the power supply in the event of a collision; wherein the first mechanical contact is arranged substantially perpendicular to the second mechanical contact in relation to a transverse plane of the vehicle.

The electrical component may for example be an electric machine used for propulsion of the vehicle, or it may be other components used for peripheral functions in a vehicle.

A lead should in the present context be understood as a wire, cable or a similar connection which electrically connects the power supply to one or more electrical components.

The transverse plane of the vehicle refers to the plane parallel to the horizontal plane when the vehicle is level on flat ground. It may also be seen as the plane of the chassis of the vehicle.

The present disclosure is based on the realization that it is desirable to provide a contact arrangement which enables safe and controlled reconnection of the power supply after a collision resulting in the disconnection of the power supply, while at the same time providing increased safety as a reconnection of the power supply as a result of a secondary force applied to the vehicle after the initial collision is avoided.

In the event of a collision resulting in a primary force triggering disconnection of the power supply, the contacts are configured to mechanically break the electric circuit connecting the power supply to other parts of the vehicle. However, a secondary a force may come from a secondary collision. Alternatively, the force resulting from the initial collision may be applied for a period of time longer than the time it takes to disconnect the contact, thereby providing a risk that a contact may be reconnected if the secondary force acts in a direction aligned with the contact.

Thus, a contact arrangement according to various embodiments of the present disclosure where the two contacts are arranged substantially perpendicular to each other solves the aforementioned problem of reconnection as a result of a secondary force, as a secondary force acting on the vehicle may at most be aligned with, and possibly reconnect, one of the contacts.

It is understood by the person skilled in the art that the contacts must not be arranged entirely perpendicular to each other in order to achieve the desired effect. The contacts may for example be arranged at an angle between 50-130°, preferable between 75-105° and most preferably between 85-95° with respect to each other.

According to one embodiment of the disclosure, the contact arrangement may advantageously be configured to disconnect the power supply by moving a switch element of the first mechanical contact in a first direction in the transverse plane of the vehicle; and by moving a switch element of the second mechanical contact in a second direction in relation to the transverse plane of the vehicle substantially perpendicular to the first direction.

Furthermore, the mechanical contact may advantageously be an electromechanical relay. In particular, the electromechanical relay may be of the contactor type able to handle the relatively high currents and voltages required for powering an electrical motor for propulsion of a hybrid or an electrical vehicle. The contactors are then arranged so that the moving contact portion of the first contactor is arranged substantially perpendicular to the moving contact portion of the second contactor.

In one embodiment of the disclosure, the contact arrangement may further comprise a collision detector configured to detect a collision of the vehicle. When a collision is detected by the collision detector, the first contact and the second contact is disconnected.

Furthermore, the collision detector may advantageously be an accelerometer. By connecting a collision detector in the form of an accelerometer to the contact arrangement and configure the contacts to disconnect when the accelerometer detects a certain acceleration higher than a predetermined value, it may be ensured that the contacts are not disconnected as a result of normal acceleration or deceleration during operation of the vehicle.

Alternatively, accelerometers or other types of collision sensors used for other purposes in the vehicle may provide a signal indicative of a collision also to the contact arrangement. For example, one or more accelerometers are typically connected to the airbag system of a vehicle for triggering airbags in the event of a collision.

In one embodiment of the disclosure, the contact arrangement may further comprise a control unit for controlling the disconnection of the first contact and the second contact. The control unit may for example receive a signal indicating that a collision has occurred from a collision detector internal to the contact arrangement or from an external detector.

According to a second aspect of the disclosure, it is provided a power supply arrangement for a vehicle comprising: a power supply; a first mechanical contact for connecting a first lead of the power supply to an electrical component; and a second mechanical contact for connecting a second lead of a power supply to an electrical component; wherein the first mechanical contact is arranged substantially perpendicular to the second mechanical contact a transverse plane of the vehicle.

In one embodiment of the disclosure wherein the power supply may be an energy storage such as a battery. A battery or a fuel cell is typically used as a power supply in an electrical or hybrid vehicle.

Effects and features of this second aspect of the present disclosure are largely analogous to those described above in connection with the first aspect of the disclosure.

Furthermore, it is provided a vehicle comprising: an electrical machine; a power supply providing power to the electrical machine; and a contact arrangement according to any of the aforementioned embodiments arranged between the power supply and the electrical machine.

Moreover, the vehicle may typically be a hybrid vehicle or an electrical vehicle. In particular, the vehicle may be a car.

Further features of, and advantages with, the present disclosure will become apparent when studying the appended claims and the following description. The skilled person realize that different features of the present disclosure may be combined to create embodiments other than those described in the following, without departing from the scope of the present disclosure.

BRIEF DESCRIPTION OF THE DRAWINGS

These and other aspects of the present disclosure will now be described in more detail with reference to the appended drawings showing an example embodiment of the disclosure, wherein.

DETAILED DESCRIPTION

In the present detailed description, various embodiments of a contact arrangement according to the present disclosure are mainly discussed with reference to a contact arrangement for disconnecting a battery in a hybrid vehicle. It should be noted that this by no means limits the scope of the present disclosure which is equally applicable for disconnecting other types of power sources in a vehicle.

Figure 1:
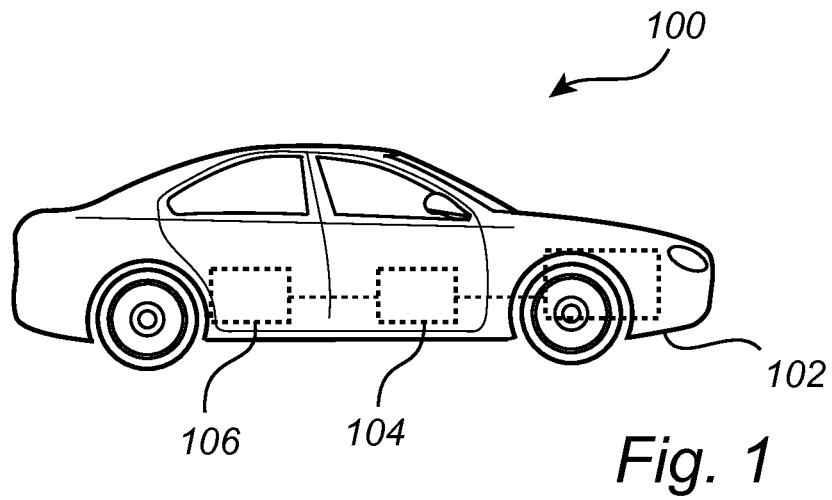
FIG. 1 schematically illustrates a vehicle comprising a contact arrangement according to an embodiment of the disclosure.

FIG. 1 schematically illustrates a vehicle 100 comprising at least one electrical motor 102 for propulsion of the vehicle 100. The vehicle 100 may be a hybrid vehicle combining electrical motors with a combustion engine or it may be an electric vehicle using a battery as the sole power source. A contact arrangement 104 is electrically connecting the electrical motor 102 to a battery 106.

Figure 2:
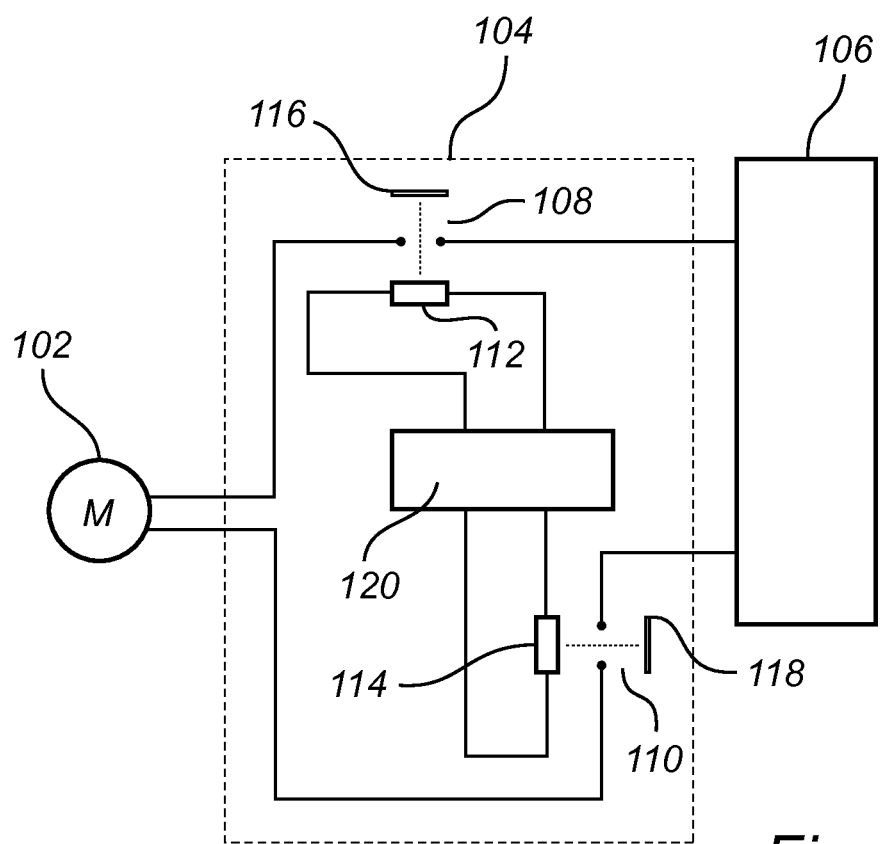
FIG. 2 schematically illustrates a contact arrangement according to an embodiment of the present disclosure.

FIG. 2 is a schematic illustration of the contact arrangement 104. A first mechanical contact 108 and a second mechanical contact 110 in the form of electromagnetic relays are arranged to control the electrical connection between the battery 106 and the motor 102. When both contacts are closed, an electric circuit is formed connecting the battery to the motor. In the present example, each contact comprises a coil 112, 114 and a switch element 116, 118. An electromagnetic contact used for switching a power circuit with relatively high current loads may also be referred to as a contactor. Here, the contacts 108, 110 are illustrated as open, i.e. the battery 106 is disconnected from the electrical motor 102 and from other components which may be powered by the battery. The contacts are arranged so that the orientation of the two contacts is essentially perpendicular to each other in the lateral plane of the vehicle. The contacts may be arranged so that one of the contacts is arranged essentially along the length direction of the vehicle.

In the present example, the contacts 108, 110, are configured so that when a voltage is applied over the coils 112, 114, an electromagnetic force is induced which force the switch elements 116, 118, to be in a closed position, thereby closing the electrical circuit between the battery 106 and the motor 102. A high voltage relay may advantageously be used as a contact. When used in an electric or hybrid vehicle, the contact may have a power handling capacity capable of handling currents of several 1000 A at voltages of 300-400V.

The contact arrangement further comprises a control unit 120 for controlling the position of the switch elements 116, 118 by controlling the voltage applied over the coils 112, 114.

In the event of a collision, the control unit 120 acts to disconnect the battery by removing the voltage applied on the coils 112, 114, thereby disengaging the switch elements 116, 118. Alternatively, the contacts may be configured so that the electrical circuit is closed when no voltage is applied to the contact, thus requiring an applied voltage for disconnecting the circuit. The control unit 120 may comprise a collision sensor for detecting a collision event, or it may receive an input signal form an external collision sensor indicating that a collision has occurred. A collision sensor may for example be an accelerometer configured to determine that a collision has occurred if a detected acceleration exceeds a predetermined threshold value. As a vehicle commonly is provided with one or more collision sensors for triggering air bag systems, such collision sensors may be used to provide an input to the control system 120.

The control unit 120 may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

Through the essentially perpendicular arrangement of the contacts 108, 110, a secondary force which occurs after the collision event triggering the disconnection will not lead to that the contacts are reconnected. Such a secondary force may for example come from a second collision. As is readily realized by the person skilled in the art, the arrangement of the contacts must not be exactly perpendicular to achieve the desired effect.

Even though the disclosure has been described with reference to specific exemplifying embodiments thereof, many different alterations, modifications and the like will become apparent for those skilled in the art. For example, the contact arrangement according to embodiments of the disclosure may be embodied in a single contacting device having two or more integrated contacts or switch elements. Moreover, the general concept may be applied in a contact arrangement using more than two contacts in order to provide additional safety or for use in electrical circuits comprising more than two conductors. For example, a contact arranged along the vertical axis of the vehicle may be included.

Also, it should be noted that parts of the system may be omitted, interchanged or arranged in various ways, the contact arrangement yet being able to perform the functionality of the present disclosure.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A contact arrangement for connecting a power supply to electrical components in a vehicle, the contact arrangement comprising:
   a first mechanical contact for selectively connecting a first lead of the power supply to an electrical component; and
   a second mechanical contact for selectively connecting a second lead of the power supply to the electrical component, the first and second mechanical contacts configured to disconnect the power supply in the event of a collision;
   wherein the first mechanical contact is arranged substantially perpendicular to the second mechanical contact in relation to a transverse plane of the vehicle, the substantially perpendicular arrangement preventing reconnection of at least one of the first and second mechanical contacts as a result of a secondary collision after the collision.

2. The contact arrangement according to claim 1, configured to disconnect the power supply by moving a switch element of the first mechanical contact in a first direction in the transverse plane of the vehicle, and by moving a switch element of the second mechanical contact in a second direction in relation to the transverse plane of the vehicle substantially perpendicular to the first direction.

3. The contact arrangement according to claim 2, further comprising a control unit for controlling the disconnection of the first contact and the second contact.

4. The contact arrangement according to claim 3, wherein the control unit is configured to disconnect the first contact and the second contact if a collision is detected.

5. A vehicle comprising:
   an electrical machine;
   a power supply providing power to the electrical machine; and
   a contact arrangement according to claim 2 arranged between the power supply and the electrical machine.

6. The vehicle according to claim 5, wherein the vehicle is a hybrid vehicle or an electrical vehicle.

7. The contact arrangement according to claim 1, wherein each mechanical contact is an electromechanical relay.

8. The contact arrangement according to claim 1, further comprising a collision detector configured to detect a collision of the vehicle.

9. The contact arrangement according to claim 8, wherein the collision detector is an accelerometer.

10. The contact arrangement according to claim 8, wherein the first contact and second contact are configured to disconnect the power supply if a collision is detected by the collision detector.

11. A vehicle comprising:
    an electrical machine;
    a power supply providing power to the electrical machine; and
    a contact arrangement according to claim 1 arranged between the power supply and the electrical machine.

12. The vehicle according to claim 11, wherein the vehicle is a hybrid vehicle or an electrical vehicle.

13. A power supply arrangement for a vehicle comprising:
    a power supply;
    a first mechanical contact for selectively connecting a first lead of the power supply to an electrical component; and
    a second mechanical contact for selectively connecting a second lead of a power supply to an electrical component, the first and second mechanical contacts configured to disconnect the power supply from an electrical component in the event of a collision;
    wherein the first mechanical contact is arranged substantially perpendicular to the second mechanical contact in relation to a transverse plane of the vehicle, the substantially perpendicular arrangement preventing reconnection of at least one of the first and second mechanical contacts as a result of a secondary collision after the collision.

14. The power supply arrangement according to claim 13, configured to disconnect the power supply by moving a switch element of the first mechanical contact in a first direction in the transverse plane of the vehicle, and by moving a switch element of the second mechanical contact in a second direction in relation to the transverse plane of the vehicle substantially perpendicular to the first direction.

15. The contact arrangement according to claim 14, further comprising a control unit for controlling the disconnection of the first contact and the second contact.

16. The contact arrangement according to claim 15, wherein the control unit is configured to disconnect the first contact and the second contact if a collision is detected.

17. The power supply arrangement according to claim 13, wherein the power supply is an energy storage.

18. The power supply arrangement according to claim 13, wherein the power supply is a battery.

19. The power supply arrangement according to claim 13, wherein the power supply is a fuel cell.

20. The contact arrangement according to claim 13, further comprising a collision detector configured to detect a collision of the vehicle.

* * * * *